United States Patent
Peeters et al.

(10) Patent No.: US 11,651,064 B2
(45) Date of Patent: *May 16, 2023

(54) PROCESSOR AUTHENTICATION METHOD

(71) Applicants: STMICROELECTRONICS (ROUSSET) SAS, Rousset (FR); PROTON WORLD INTERNATIONAL N.V., Diegem (BE)

(72) Inventors: Michael Peeters, Tourinnes-la-Grosse (BE); Fabrice Marinet, Chateauneuf le Rouge (FR)

(73) Assignees: STMICROELECTRONICS (ROUSSET) SAS, Rousset (FR); PROTON WORLD INTERNATIONAL N.V., Diegem (BE)

( * ) Notice: Subject to any disclaimer, the term of this patent is extended or adjusted under 35 U.S.C. 154(b) by 461 days.

This patent is subject to a terminal disclaimer.

(21) Appl. No.: 16/832,966

(22) Filed: Mar. 27, 2020

(65) Prior Publication Data

US 2020/0311247 A1    Oct. 1, 2020

(30) Foreign Application Priority Data

Mar. 29, 2019 (FR) ...................... 1903343

(51) Int. Cl.
*G06F 21/44* (2013.01)
*G06F 7/57* (2006.01)
*G06F 9/38* (2018.01)

(52) U.S. Cl.
CPC ............... *G06F 21/44* (2013.01); *G06F 7/57* (2013.01); *G06F 9/3818* (2013.01)

(58) Field of Classification Search
CPC .......... G06F 21/44; G06F 7/57; G06F 9/3818; G06F 9/30145; G06F 9/30181;
(Continued)

(56) References Cited

U.S. PATENT DOCUMENTS 5,974,529 A    10/1999   Zumkehr et al.
6,308,256 B1   10/2001   Folmsbee
(Continued)

FOREIGN PATENT DOCUMENTS

EP    0 825 528 A2    2/1998

OTHER PUBLICATIONS

Lashermes et al., "Hardware-Assisted Program Execution Integrity: HAPEI," 23rd Nordic Conference on Secure IT Systems, Nov. 2018, Oslo, Norway, 16 pages.
(Continued)

*Primary Examiner* — Farley Abad
(74) *Attorney, Agent, or Firm* — Seed Intellectual Property Law Group LLP

(57) ABSTRACT

The disclosure includes a method of authenticating a processor that includes an arithmetic and logic unit. At least one decoded operand of at least a portion of a to-be-executed opcode is received on a first terminal of the arithmetic and logic unit. A signed instruction is received on a second terminal of the arithmetic and logic unit. The signed instruction combines a decoded instruction of the to-be-executed opcode and at least one previously-executed opcode.

20 Claims, 4 Drawing Sheets

(a)

(b)

(58) Field of Classification Search
CPC ...... G06F 21/123; G06F 21/608; G06F 21/71; G06F 9/30007; G06F 9/30105; G06F 9/3824

See application file for complete search history.

(56) References Cited

U.S. PATENT DOCUMENTS

| | | | | |
|---|---|---|---|---|
| 6,574,728 | B1* | 6/2003 | Chayut | G06F 9/30134 |
| | | | | 712/226 |
| 6,594,752 | B1* | 7/2003 | Baxter | G06F 9/30181 |
| | | | | 712/E9.035 |
| 7,581,079 | B2* | 8/2009 | Pechanek | G06F 9/3001 |
| | | | | 712/16 |
| 7,941,651 | B1 | 5/2011 | Toll et al. | |
| 9,177,111 | B1 | 11/2015 | Squires et al. | |
| 9,652,246 | B1* | 5/2017 | Tam | G06F 9/3855 |
| 2004/0044717 | A1 | 3/2004 | Makineni et al. | |
| 2005/0216707 | A1* | 9/2005 | Taylor | G06F 9/3867 |
| | | | | 712/E9.046 |
| 2006/0095975 | A1 | 5/2006 | Yamada et al. | |
| 2010/0070953 | A1 | 3/2010 | Velten et al. | |
| 2010/0153672 | A1 | 6/2010 | Jogand-Coulomb et al. | |
| 2011/0167496 | A1* | 7/2011 | McPhail | G06F 21/72 |
| | | | | 726/26 |
| 2012/0233446 | A1 | 9/2012 | Gammel et al. | |
| 2013/0111190 | A1 | 5/2013 | Muff et al. | |

OTHER PUBLICATIONS

Lee, "Schemes and Applications for Binding Hardware and Software in Computing Devices" doctoral thesis, University of London, London, United Kingdom, 2018, 176 pages.

Werner et al., "Sponge-Based Control-Flow Protection for IoT Devices," arXiv: 1802.06691v1, Feb. 19, 2018, 13 pages.

* cited by examiner (a)

(b)

(a)

(b)

PROCESSOR AUTHENTICATION METHOD

BACKGROUND

Technical Field

The present disclosure generally concerns electronic devices and, more particularly, processors.

Description of the Related Art

A processor, comprised within most current electronic devices, is a processing unit which executes opcodes.

Processors are frequently subject to attempts of cloning and of emulation of the opcodes that they have to execute.

It would be desirable to at least partly improve certain aspects of known processor implementation methods and, more particularly, to at least partly improve authentication methods executed by a processor.

BRIEF SUMMARY

An embodiment overcomes all or part of the disadvantages of known processor forming methods.

An embodiment overcomes all or part of the disadvantages of known authentication methods implemented by a processor.

An embodiment provides a method of authenticating a processor, comprising an arithmetic and logic unit, comprising the steps of: receiving, on a first terminal of the arithmetic and logic unit, at least one decoded operand of at least a portion of an opcode to be executed; and receiving, on a second terminal of the arithmetic and logic unit, a first instruction combining a second decoded instruction of the opcode to be executed and at least one previously-executed opcode.

According to an embodiment, said at least one portion of the opcode to be executed represents the entire opcode to be executed.

According to an embodiment, said first instruction is delivered by an output of a combination circuit.

According to an embodiment, the combination circuit receives as an input said second instruction of the opcode to be executed and data taking into account said at least one previously-executed opcode.

According to an embodiment, said at least one previously-executed opcode is stored in a context register bank.

According to an embodiment, the method comprises the processing, by the arithmetic and logic unit, of said first instruction and of the at least one operand.

According to an embodiment, said first instruction combines said second decoded instruction of the opcode to be executed, said at least one previously-executed opcode and at least one previous result of said arithmetic and logic unit.

An embodiment provides a processor wherein an arithmetic and logic unit comprises: a first terminal capable of receiving at least one decoded operand of at least a portion of an opcode to be executed; and a second terminal capable of receiving a first instruction combining a second decoded instruction of an opcode to be executed and at least one previously-executed opcode.

According to an embodiment, the processor comprises a combination circuit capable of delivering said first instruction to the second terminal of the arithmetic and logic unit.

According to an embodiment, the combination circuit is capable of receiving, as an input, said second instruction of the opcode to be executed and data taking into account said at least one previously-executed opcode.

According to an embodiment, the processor comprises a context register bank capable of storing said at least one previously-executed opcode.

According to an embodiment, the arithmetic and logic unit is capable of processing said first instruction received on its first terminal and said at least one operand received on its second terminal.

According to an embodiment, said first instruction combines said second decoded instruction of the opcode to be executed, said at least one previously-executed opcode, and at least one previous result of said arithmetic and logic unit.

According to an embodiment, the processor comprises a decoding circuit capable of decoding the opcode into at least one operand and into said second instruction.

According to an embodiment, the processor comprises a multiplexer capable of receiving said at least one operand and of delivering it to the first terminal of the arithmetic and logic unit.

An embodiment provides an instruction implemented by the previously described processor comprising an arithmetic and logic unit taking into account at least a portion of an opcode previously executed by said arithmetic and logic unit.

The foregoing and other features and advantages will be discussed in detail in the following non-limiting description of specific embodiments in connection with the accompanying drawings.

DETAILED DESCRIPTION

Figure 1:
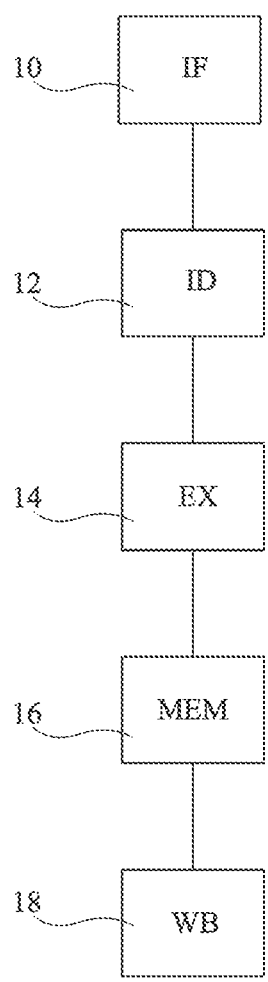
FIG. 1 shows a flowchart illustrating an embodiment of a processor.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, all the elements forming the architecture of a processor will not be described, only the elements relative to the described embodiments will be detailed, such elements adapting the usual processor architectures.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

The following notations are used:
opcode: an operation to be executed by a processor and comprising an instruction and one or a plurality of operands;
operand of an opcode: a numerical, logic, alphanumerical, etc., value contained by the opcode;
instruction of an opcode: an effective mathematical or logic operation which is applied to one or a plurality of operands of the opcode; and command: a set or a succession of opcodes.

FIG. 1 is a flowchart illustrating a method of processing, by a processor, of an opcode to be executed. The processing method is a processing method used by a processor. As an example, the processor is a processor of RISC ("Reduced Instruction Set Computing") type.

At a step 10 (IF, "Instruction Fetch"), an opcode is delivered, for example, by a bus, to the processor. As an example, the opcode is uploaded from a memory.

At a step 12 (ID, "Instruction Decode"), the opcode is decoded by a decoding unit of the processor. More particularly, the opcode is converted into an instruction and one or a plurality of operands.

At a step 14 (EX, "Execution"), the decoded opcode, that is, the instruction and the operand(s), is delivered to an arithmetic and logic unit comprised within the processor. The arithmetic and logic unit is in charge of implementing the opcode, by performed calculations on the operands of the opcode in accordance with the instruction of the opcode to be executed.

At a step 16 (MEM, "Memory Access"), the arithmetic and logic unit requires access to a register of a register bank or stack, to store therein the result of the calculations of the executed opcode. At this step, the processor may, further, access an external memory to, for example, read therefrom and/or write into it one or a plurality of data.

At a step 18 (WB, "Write Back"), the arithmetic and logic unit provides the result of its calculations to the register bank to store it into a register.

Figure 2:
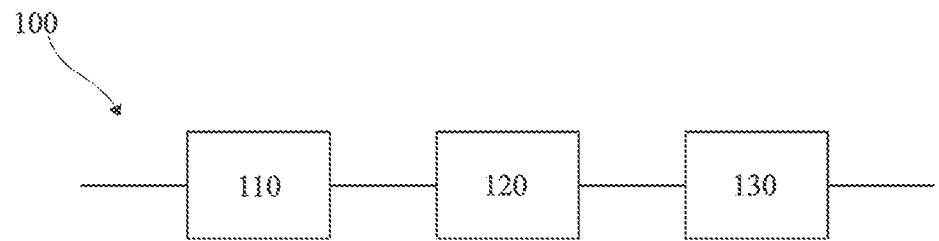
FIG. 2 shows a flowchart (a) illustrating an implementation mode of an authentication method executed by a processor, and a block diagram (b) illustrating the architecture of a processor.
Figure 2:
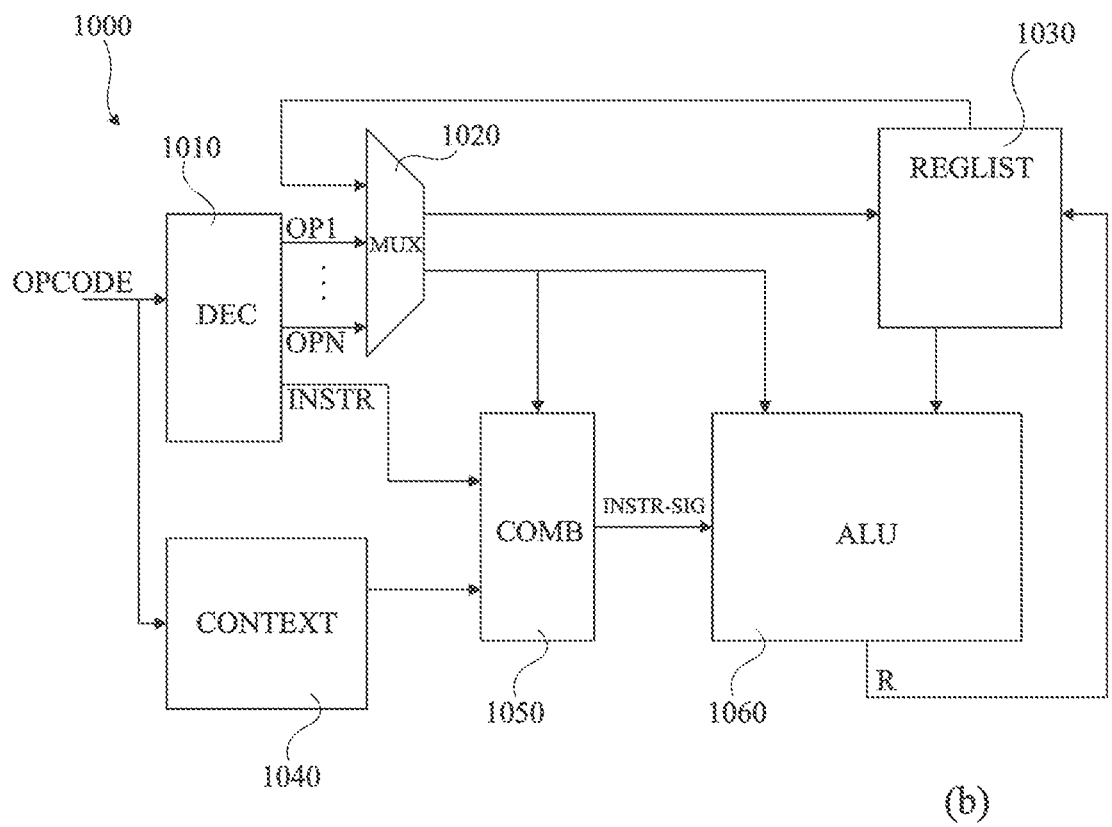

FIG. 2 illustrates an embodiment of a method 100 of authentication of a processor 1000. FIG. 2 comprises a flowchart (a) illustrating the steps of authentication method 100, and a diagram (b), in the form of blocks, illustrating a simplified architecture of processor 1000.

Authentication method 100 comprises:
a step 110 of uploading, by processor 1000, of an opcode to be executed;
a step 120 of decoding of the opcode to be executed; and
a step 130 of processing of the opcode to be executed.

Step 110 is similar to step 10 described in relation with FIG. 1. An opcode OPCODE is received and uploaded by processor 1000.

Step 120 is similar to step 12 described in relation with FIG. 1. Opcode OPCODE is decoded, by a decoding unit 1010 (DEC), into one or a plurality of operands OP1, . . . , OPN, and into an instruction INSTR.

Step 130 comprises steps similar to steps 14, 16, and 18 described in relation with FIG. 1 and further comprises the use of one or a plurality of opcodes previously executed by processor 1000. The detail of step 130 will be described hereafter in relation with the description of the architecture of processor 1000.

Device 1000 comprises:
decoding unit 1010;
a multiplexer 1020 (MUX);
a register bank 1030 (REGLIST);
a context register bank 1040 (CONTEXT);
a combination circuit 1050 (COMB); and
an arithmetic and logic unit 1060 (ALU).

A previously indicated, decoding unit 1010 operates to decode the opcode OPCODE into a plurality of operands OP1, . . . , OPN, and into an instruction INSTR. Thus, decoding unit 1010 receives as an input the opcode OPCODE uploaded at step 110 and outputs operands OP1, . . . , OPN, and instruction INSTR (step 120). In some embodiments, decoding unit 1010 supplies operands OP1, . . . , OPN to inputs of multiplexer 1020, and instruction INSTR to an input of combination circuit 1050.

Multiplexer 1020 operates to select and to direct the operands OP1, . . . , OPN for the processing of opcode OPCODE towards arithmetic and logic unit 1060, which may be received by a first input terminal of arithmetic and logic unit 1060. In some embodiments, multiplexer 1020 directs all or part of the operands towards combination circuit 1050. Multiplexer 1020 receives as inputs operands OP1, . . . , OPN and for example an output of register bank 1030. Multiplexer 1020 transmits at its output operands OP1, . . . , OPN to arithmetic and logic unit 1060 and to an input of combination circuit 1050. In some embodiments, multiplexer 1020 also outputs all or part of operands OP1, . . . , OPN of opcode OPCODE to register bank 1030.

Register bank 1030 operates to temporarily store, into registers, data, for example, operands OP1, . . . , OPN of opcode OPCODE, and results R of arithmetic and logic unit 1060, etc. Register bank 1030 may further operate to provide other operands, for example, directly or via multiplexer 1020, to arithmetic and logic unit 1060. Register bank 1030 receives as an input an output of arithmetic and logic unit 1060 and for example the output of multiplexer 1020. Register bank 1030 delivers at its output data to arithmetic and logic unit 1060 and, for example, to multiplexer 1020.

Context register bank 1040 is a register bank storing, in registers, the opcodes previously executed by processor 1000. For example, the previously-executed opcode is decoded by the decoding unit 1010 before the opcode OPCODE. As an example, context register bank 1040 may store all or part of the previously-executed opcodes in a stack, or in a circular buffer, and/or it may apply thereto, for storage, a mathematical function, for example, a permutation. As an example, context register bank 1040 may take into account the opcode to be executed or being executed. Context register bank 1040 receives as an input opcode OPCODE in order to store it. Context register bank 1040 delivers as an output data to combination circuit 1050. The output data of context register bank 1040 may be all or a part of the previously-executed opcode and may be referred to as a "signature data" for descriptive purposes.

Combination circuit 1050 operates to combine the decoded instruction INSTR of opcode OPCODE with the data of the output of context register bank 1040. In some embodiments, combination circuit 1050 operates to deliver to arithmetic and logic unit 1060 a new instruction comprising a data signature depending on the opcodes previously executed by processor 1000. Combination circuit 1050 may for example be controlled by one or more of the decoded operands of opcode OPCODE, e.g., selected and delivered by multiplexer 1020. For example, the one or more of the decoded operands may select the signature data to be combined with the instruction INSTR. This new instruction will be called in the rest of the description as a signed instruction INSTR-SIG. Thus, combination circuit 1050 receives, as an input, instruction INSTR and the output of context register bank 1040. Combination circuit 1050 delivers, as an output, signed instruction INSTR-SIG to arithmetic and logic unit 1060, which may be received at a second input terminal of arithmetic and logic unit 1060 that is different from the first input terminal. According to an alternative embodiment, combination circuit 1050 may only combine certain decoded instructions INSTR with the data of the output of context register bank 1040, and transmit the other decoded instructions INSTR, without signing them, directly to arithmetic and logic unit 1060.

Arithmetic and logic unit 1060 operates to implement the processing and the calculations of opcode OPCODE. In some embodiments, arithmetic and logic unit 1060 applies signed instruction INSTR-SIG to the operands delivered by multiplexer 1020. In some embodiments, arithmetic and logic unit 1060 may also take into account data supplied by register bank 1030. Arithmetic and logic unit 1060 receives as an input signed instruction INSTR-SIG from combination circuit 1050, the output of multiplexer 1040, and the output of register bank 1030. Arithmetic and logic unit 1060 delivers, as an output, a result signal R to the input of register bank 1030.

Step 130 is carried out as follows. Combination circuit 1050 combines instruction INSTR with data received from context register bank 1040 to supply arithmetic and logic unit 1060 with signed instruction INSTR-SIG. Arithmetic and logic unit 1060 performs the calculations relative to, e.g., using, signed instruction INSTR-SIG and the operands supplied by multiplexer 1020. The arithmetic and logic unit 1060 then requires access to register bank 1030 to store result signal R therein.

An advantage of this embodiment is that, for an identical opcode OPCODE, an arithmetic and logic unit of a usual processor will generate result signals different from those generated by the arithmetic and logic unit 1060 of processor 1000 of the embodiments because a usual processor does not access the signed instruction INSTR-SIG. Result signal R might for example be used as a control signal used as means for authenticating a device during its use.

An example of application of this embodiment is the following. A processor generally receives one or a plurality of commands each comprising a plurality of opcodes. To use the method of this embodiment, it is sufficient for a single instruction relative to one of the opcodes to be signed by combination circuit 1050. As an example, a command may comprise a single signed instruction configured to authenticate the device. According to some embodiments, all the instructions linked to a same command may be signed by combination circuit 1050.

An illustrative example of application may be the following. A printer comprising a processor of the type of processor 1000 and an ink cartridge capable of communicating data to the printer are considered. The data are, for example, filling levels or ink cartridge authentication data. The installation of the cartridge in the printer may be followed by a series of commands sent by the cartridge to the printer. If the cartridge is intended to be installed in the considered printer, the designer of the cartridge will have prepared the opcodes of the series of commands so that they are adapted to the architecture of the printer processor. In other words, in this case, the opcodes will be capable of taking into account the data of context register bank 1040. However, if the opcodes of the series of commands are not adapted to the architecture of processor 1000, the results R delivered by arithmetic and logic unit 1060 will not be those expected by the other printer circuits, which may for example switch to the default mode. It should be noted that it is sufficient for a single instruction in the series of commands to be signed to, for example, actuate a default mode of the other printer circuits. It may also be configured to sign all the instructions of the series of commands.

Figure 3:
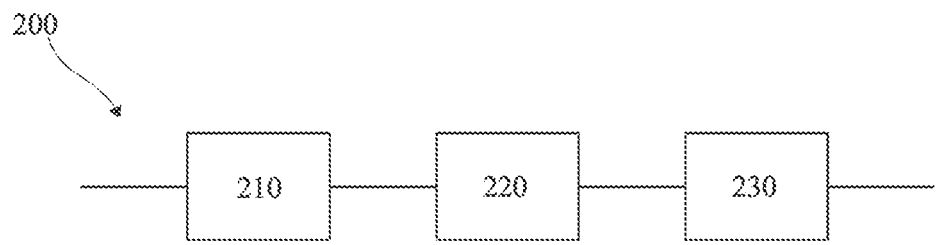
FIG. 3 shows a flowchart (a) illustrating an implementation mode of an authentication method executed by a processor, and a block diagram (b) illustrating the architecture of a processor.
Figure 3:
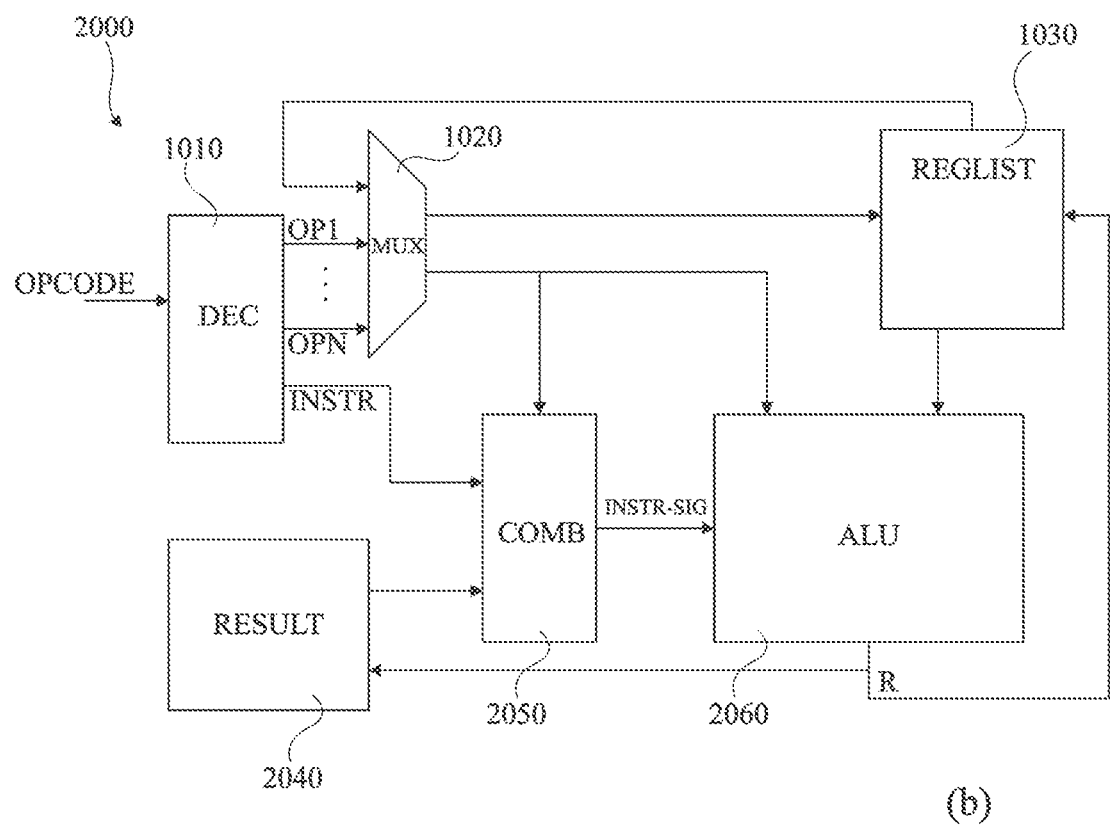

FIG. 3 illustrates an embodiment of a method 200 of authenticating a processor 2000. FIG. 3 comprises a flowchart (a) illustrating the steps of the authentication method and a diagram (b), in the form of blocks, illustrating a simplified architecture of processor 2000. Parts of method 200 and processor 2000 are similar to the method 100 and to the processor 1000 described in relation with FIG. 2, the differences between them being described hereafter.

Authentication method 200 comprises:
a step 210 of uploading an opcode to be executed;
a step 220 of decoding the opcode to be executed; and
a step 230 of processing the opcode to be executed.

Step 210 is similar to step 110 described in relation with FIG. 2. An opcode OPCODE is received and uploaded by processor 2000.

Step 220 is similar to step 120 described in relation with FIG. 2. Opcode OPCODE is decoded, by decoding unit 1010 (DEC) of processor 2000, into one or a plurality of operands OP1, . . . , OPN, and into an instruction INSTR.

Step 230 differs from step 130 described in relation to FIG. 2 in that the use of previously-executed opcodes is replaced with the use of one or more of a plurality of previous results of the arithmetic and logic unit 2060 of processor 2000. The detail of step 230 will be described hereafter in relation with the description of the architecture of processor 2000.

Processor 2000 comprises elements in common with processor 1000, which elements will not be described again. Thus, processor 2000 comprises:
decoding unit 1010;
multiplexer 1020 (MUX);
register bank 1030 (REGLIST);
a result register bank 2040 (RESULT);
a combination circuit 2050 (COMB); and
arithmetic and logic unit 2060 (ALU).

Result register bank 2040 is a register bank storing the previous results of arithmetic and logic unit 2060. As an example, result register bank 2040 may store the previous results in a stack, and/or it may apply thereto, for storage, a mathematical function, for example, a permutation. Result register bank 2040 receives as an input result R of arithmetic and logic unit 2060 in order to store it. Result register bank 2040 delivers, at its output, data to combination circuit 2050, the data thus depending on the previous results of arithmetic and logic unit 2060. Result register bank 2040 is for example a register capable of operating as a shift register where the last stored information is the first information to be suppressed, or as a linear feedback shift register. In some embodiments, a result R of arithmetic and logic unit 2060 is a result of the arithmetic and logic unit 2060 with respect to a previously-executed opcode. That is, the result R corresponds to a previously-executed opcode.

Combination circuit 2050 differs from the combination circuit 1050 described in relation with FIG. 2 in that combination circuit 2050 receives the output of result register bank 2040. Combination circuit 2050 combines the decoded instruction INSTR of opcode OPCODE with the data of the output of result register bank 2040. In some embodiments, combination circuit 2050 delivers an instruction INSTR-SIG signed by the previous results of arithmetic and logic unit 2060. Thus, the combination circuit receives, as an input, instruction INSTR and the output of result register bank 2040. Combination circuit 2050 delivers at its output the new instruction INSTR-SIG to arithmetic and logic unit 2060. According to an embodiment, combination circuit 2050 may only combine certain decoded instructions INSTR with the data of the output of result register bank 2040 and transmit the other instructions INSTR, without signing them, directly to arithmetic and logic unit 2060.

Arithmetic and logic unit 2060 differs from the arithmetic and logic unit 1060 described in relation with FIG. 2 in that it delivers, at its output, output signal R to register bank 1030 and to result register bank 2040.

Step 230 is thus carried out differently from the step 130 described in relation with FIG. 1, in that the instructions which are signed are signed with data taking into account the previous results of arithmetic and logic unit 2060.

This embodiment has the similar advantages as the embodiment described in relation with FIG. 2.

Figure 4:
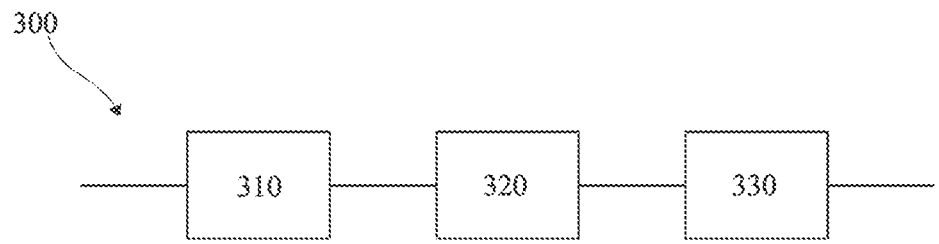
FIG. 4 shows a flowchart (a) illustrating an embodiment of an authentication method executed by a processor, and a block diagram (b) illustrating the architecture of a processor.
Figure 4:
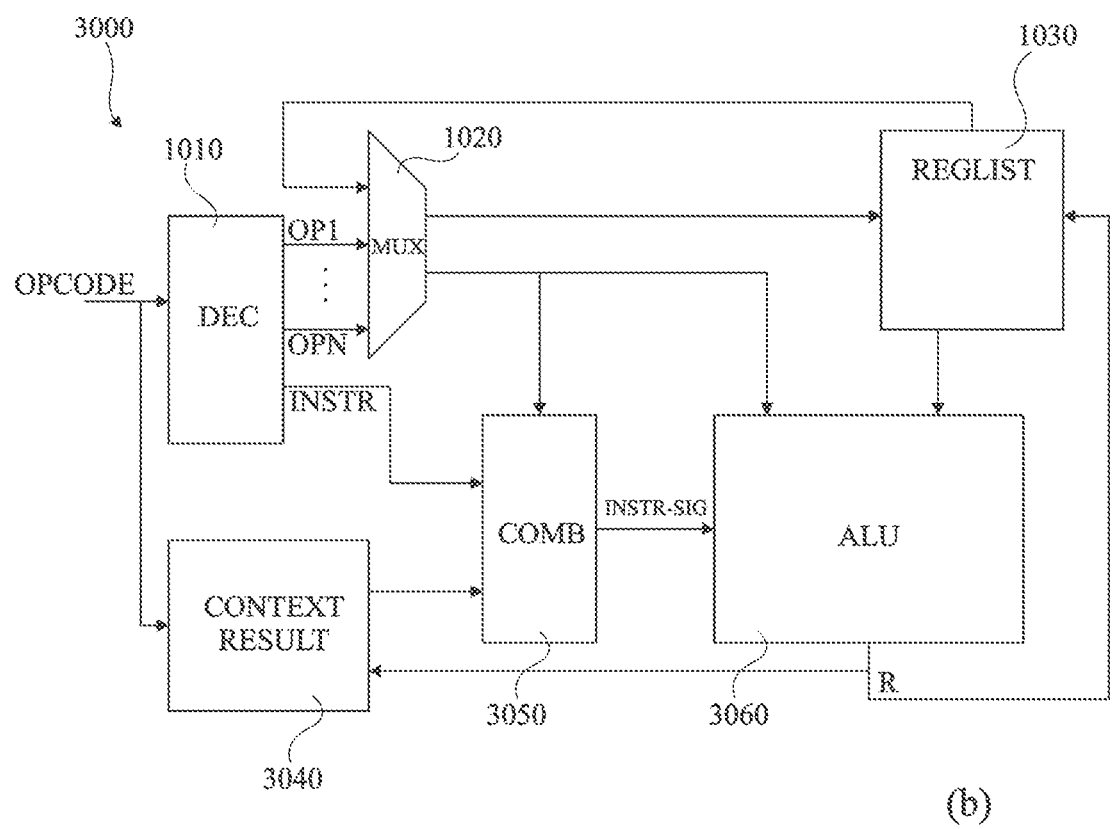

FIG. 4 illustrates an embodiment of a method 300 of authentication of a processor 3000. FIG. 4 comprises a flowchart (a) illustrating the steps of the authentication method and a diagram (b), in the form of blocks, illustrating a simplified architecture of processor 3000.

The embodiments described hereafter are a combination of the embodiments described in relation with FIGS. 2 and 3.

Authentication method 300 comprises:
a step 310 of uploading an opcode to be executed;
a step 320 of decoding the opcode to be executed; and
a step 330 of processing the opcode to be executed.

Step 310 is similar to step 110, 210 described in relation with FIGS. 2 and 3. An opcode OPCODE is received and uploaded by processor 3000.

Step 320 is similar to step 120, 220 described in relation with FIGS. 2 and 3. Opcode OPCODE is decoded, by decoding unit 1010, into one or a plurality of operands OP1, . . . , OPN, and into an instruction INSTR.

Step 330 is a combination of steps 130 and 230 described in relation with FIGS. 2 and 3. For example, step 330 comprises the use of a plurality of previous results of arithmetic and logic unit 3060 of processor 3000, and the use of one of a plurality of opcodes previously executed by processor 3000. The detail of step 330 will be described hereafter in relation with the description of the architecture of processor 3000.

Processor 3000 comprises elements in common with processors 1000 and 2000, which elements will not be described again. Thus, processor 3000 comprises:
decoding unit 1010 (DEC);
multiplexer 1020 (MUX);
register bank 1030 (REGLIST);
a context and result register bank 3040 (CONTEXT RESULT);
a combination circuit 3050 (COMB); and
an arithmetic and logic unit 3060 (ALU).

Context and result register bank 3040 is a combination of the context register bank 1040 described in relation with FIG. 2 and the result register bank 2040 described in relation with FIG. 3. More particularly, context and result register bank 3040 is configured to store opcodes previously executed by processor 3000 and previous results of arithmetic and logic unit 3060. As an example, context and result register bank 3040 may store the data in a stack, and/or it may apply thereto, for storage, a mathematical function, for example, a permutation. Context and result register bank 3040 receives, as an input, result R of arithmetic and logic unit 3060 and opcode OPCODE in order to store them. In some embodiments, the result R in the context and result register bank 3040 is a calculated result of a previously-executed opcode stored in the context and result register bank 3040. The context and result register bank 3040 corresponds the previously-executed opcode and result R in generating the signature data output. In some embodiments, the context and result register bank 3040 does not correspond the stored previously-executed opcode and result R in generating the signature data output. For example, the signature data output may include a previously-executed opcode and a result R that is not related to the previously-executed opcode. Context and result register bank 3040 delivers, as an output, data to combination circuit 3050.

Combination circuit 3050 is similar to the combination circuits 1050 and 2050 described in relation with FIGS. 1 and 2. Combination circuit 3050 combines the decoded instruction INSTR of opcode OPCODE with the data of the output of context and result register bank 3040. In some embodiments, combination circuit 3050 delivers an instruction INSTR-SIG signed by the opcodes previously executed by processor 3000 and by the previous results of arithmetic and logic unit 3060. Thus, the combination circuit receives, as an input, instruction INSTR and the output of context and result register bank 3040. Combination circuit 3050 delivers at its output the new instruction INSTR-SIG to arithmetic and logic unit 3060. According to an embodiment, combination circuit 3050 may only combine certain decoded instructions INSTR with the data of the output of context and result register bank 3040 and transmit the other decoded instructions INSTR, without signing them, directly to arithmetic and logic unit 3060.

Arithmetic and logic unit 3060 is similar to the arithmetic and logic unit 2060 described in relation with FIG. 3. For example, arithmetic and logic unit 3060 delivers output signal R to register bank 1030 and to context and result register bank 3040.

Step 330 thus operates differently from steps 130 and 230 described in relation with FIGS. 2 and 3, in that the instructions which are signed are signed with data taking into account the opcodes previously executed by processor 3000 and taking into account the previous results of arithmetic and logic unit 3060.

This embodiment has the similar advantage as the embodiments described in relation with FIGS. 2 and 3.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

The various embodiments described above can be combined to provide embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
decoding a first opcode into a decoded instruction and a plurality of decoded operands;
receiving, on a first terminal of an arithmetic and logic unit, a first decoded operand of the plurality of decoded operands;
generating a first instruction by combining the decoded instruction with a data corresponding to a second opcode; and
receiving, on a second terminal of the arithmetic and logic unit, the first instruction,
wherein the second opcode is an opcode that has been executed by the arithmetic and logic unit before the first opcode.

2. The method of claim 1, wherein the first instruction is generated at a combination circuit.

3. The method of claim 2, wherein the combination circuit receives as an input the decoded instruction of the first opcode and the data corresponding to the second opcode.

4. The method of claim 1, wherein the second opcode is stored on a context register bank.

5. The method of claim 1, comprising calculating a result by processing, at the arithmetic and logic unit, the first instruction with respect to the first decoded operand.

6. The method of claim 1, wherein the generating the first instruction combines the decoded instruction of the first opcode, at least a part of the second opcode, and a previous calculation result of the arithmetic and logic unit.

7. A processor, comprising:
a combination circuit that operates to generate a first instruction by combining a second instruction of a first opcode with a signature data corresponding to a second opcode; and
an arithmetic and logic unit having a first terminal and a second terminal, the first terminal being configured to receive a first operand of at least a portion of the first opcode and the second terminal being configured to receive the first instruction
wherein the second opcode is an opcode that has been executed by the arithmetic and logic unit prior to the first opcode.

8. The processor of claim 7, wherein the combination circuit is configured to be controlled by an operand of the first opcode.

9. The processor of claim 7, comprising a context register bank configured to store one or more of the second opcode or an execution result of the arithmetic and logic unit.

10. The processor of claim 7, wherein the arithmetic and logic unit is configured to process the first instruction received on its first terminal and the at least one operand received on its second terminal.

11. The processor of claim 7, wherein the signature data is one or more of at least a part of the second opcode or an execution result of the second opcode.

12. The processor of claim 7, comprising a decoding circuit configured to decode the first opcode into a plurality of operands including the first operand and the second instruction.

13. The processor of claim 12, comprising a multiplexer configured to receive the plurality of operands and to deliver the first operand to the first terminal of the arithmetic and logic unit.

14. An integrated circuit, comprising:
a decoding circuitry that operates to decode a first opcode into a decoded instruction and a plurality of decoded operands;
a multiplexer circuitry that operates to select a first decoded operand from the plurality of decoded operands;
a combination circuitry that operates to generate a signed instruction by combining the decoded instruction and a signature data corresponding to a second opcode that is decoded by the decoding circuitry before the first opcode; and
an arithmetic and logic circuitry that operates to calculate a first result based on the first decoded operand and the signed instruction.

15. The integrated circuit of claim 14, wherein the multiplexer operates to deliver a second decoded operand of the plurality of decoded operands to the combination circuitry, the second decoded operand controlling the combination circuitry in generating the signed instruction.

16. The integrated circuit of claim 14, comprising a register bank circuitry that operates to store the second opcode.

17. The integrated circuit of claim 14, wherein the signature data is a part of the second opcode.

18. The integrated circuit of claim 14, wherein the signature data includes the second opcode in its entirety.

19. The integrated circuit of claim 14, wherein the signature data is an execution result of the second opcode.

20. The integrated circuit of claim 14, comprising a context register circuitry configured to store one or more of the second opcode or an execution result of the arithmetic and logic circuitry.

* * * * *